(12) United States Patent
Samid

(10) Patent No.: US 11,062,279 B2
(45) Date of Patent: Jul. 13, 2021

(54) HARD WALLET: A NEW TRUST BASIS FOR DIGITAL PAYMENT

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/915,938

(22) Filed: Jun. 29, 2020

(65) Prior Publication Data

US 2021/0081911 A1    Mar. 18, 2021

Related U.S. Application Data

(63) Continuation-in-part of application No. 16/578,341, filed on Sep. 22, 2019, now Pat. No. 10,754,326.

(60) Provisional application No. 63/034,401, filed on Jun. 4, 2020, provisional application No. 63/005,062, filed on Apr. 3, 2020, provisional application No. 62/963,855, filed on Jan. 21, 2020, provisional application No. 62/931,807, filed on Nov. 7, 2019, provisional application No. 62/926,560, filed on Oct. 27, 2019, provisional application No. 62/900,567, filed on Sep. 15, 2019.

(51) Int. Cl.
*G06Q 20/06* (2012.01)
*G06Q 20/32* (2012.01)
*G06Q 20/40* (2012.01)

(52) U.S. Cl.
CPC ....... *G06Q 20/0658* (2013.01); *G06Q 20/327* (2013.01); *G06Q 20/40* (2013.01)

(58) Field of Classification Search
CPC ... G06Q 20/0658; G06Q 20/327; G06Q 20/40
See application file for complete search history.

(56) References Cited

U.S. PATENT DOCUMENTS

| 10,445,730 | B2 * | 10/2019 | Samid | G06Q 20/065 |
| 2017/0053268 | A1 * | 2/2017 | Pande | G06Q 20/363 |
| 2020/0145194 | A1 * | 5/2020 | Stollery | G06Q 20/36 |

* cited by examiner

Primary Examiner — Seung H Lee

(57) ABSTRACT

Constructing a secure enclosure (hard wallet) as a randomized assembly of material constituents with a large variety of electrical conductivity attributes, thereby achieving a unique set of physically measured properties of the enclosure, so that a party can be convinced of the authenticity of the enclosure by comparing the results of real time measurements with measurements pre-recorded in a public ledger, and then extending this trust of the enclosure into trust towards digital money paid by said enclosure.

4 Claims, 9 Drawing Sheets

No-Internet, Sustained Hardwallet to Hardwallet payment

No-Internet, Sustained
Hardwallet to Hardwallet payment

Hardwallet to Hardwallet Payment Regimen

Hardwallet (TW) Architecture

Two-Ways Hard Wallet Payment

Randomized Rock Resistance

Independent Authentication Pad

Hard Phone Wallet

TW-HPW in Action

Regional distribution of wallet Authentication Centers

The Hard Wallet Dynamics

Hard Wallet Authentication

The Transaction Authentication Triangle

HARD WALLET: A NEW TRUST BASIS FOR DIGITAL PAYMENT

MOTIVATION FOR THIS INVENTION

As money goes digital the question of authentication of a payment poses new challenges. Today it is being resolved by either authenticating the transferred money, and/or authenticating the payer. Some combination of these two payment authentication methods is used both with legacy currency, like credit and debit card payment, and with crypto currencies. Alas, both authentication methods rely on ready availability of the Internet. For digital money to become the prevailing mode of money, there is a need to be able to continue and make payments during periods of Internet availability. This invention offers this capability.

Overview: Payment today is trusted (i) on the basis of the credibility of the transacted items of value, and/or (ii) on the basis of the credibility of the payer. Proposing to add a third basis of trust: the wallet—a physical box that contains (a) digital money, and (b) operational routine to handle the money. The wallet can be tested for its authenticity. So authenticated the payee will trust digital bits issued from the wallet as representing the declared amount of money paid. The information needed to authenticate the wallet may be freely distributed. This is its fundamental advantage—authenticating a digital payment by a payee that may be deprived of network communication or any other access to a remote agent to effect the authentication. Thereby this $3^{rd}$ basis for payment authentication elevates digital money to the high resilience status it was deprived of hitherto.

This specification has two parts:
Offline Hard Wallet Payment
  Digital Payment without network communication
Online Hard Wallet Payment
  New Payment Authentication Options

The top of the figure shows unit marked R, a hard wallet (HW) comprised of a shell constructed according to the "Rock of Randomness Technology" with digital money inside. Unit R is shown with two contact pad: c* and d*. The former is used by a hardwallet to conduct authentication test to another hardwallet, and the latter is used to transfer digital money to and from another hardwallet. The figure also shows two hard wallets P and Q held in contact with each other so that HW Q conducts an authentication test to hardwallet P, and if the test is OK, then HW Q accepts digital money from hardwallet P.

Figure 1:
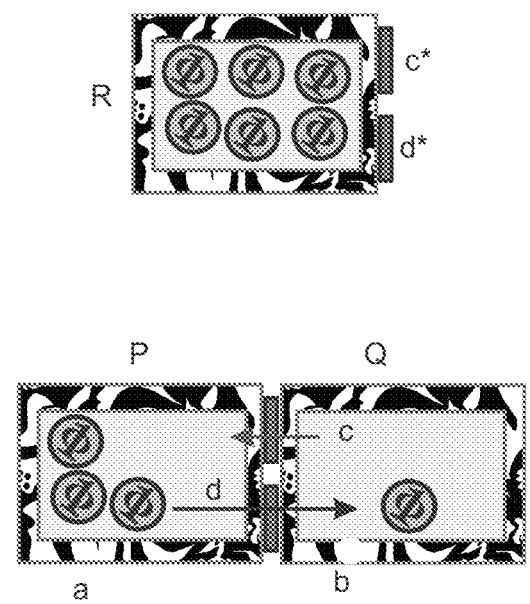
FIG. 1: No-Internet, Sustained Hardwallet to Hardwallet Payment
Figure 2:
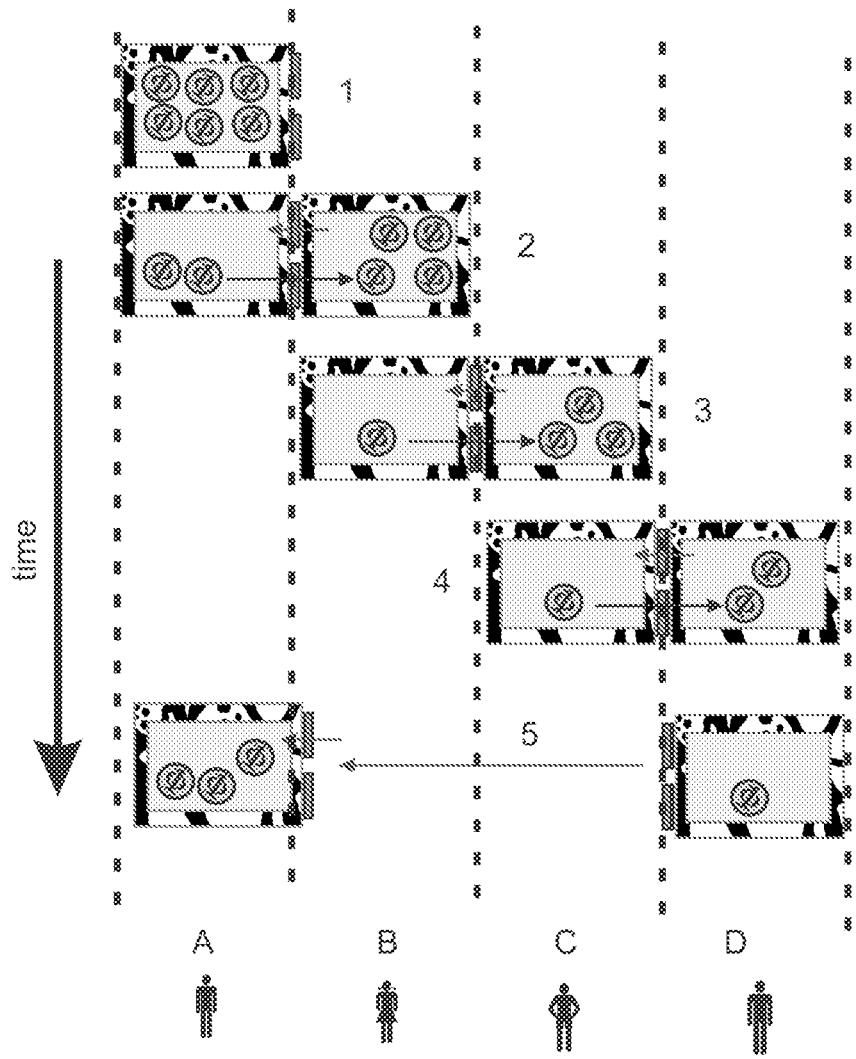

FIG. 2: Hardware to Hardware Payment Regimen

The figure shows four people (A, B, C, D) practicing hardwallet to hardwallet transactions. At time point 1 trader A is shown to have 6 digital coins in his wallet. These digital coins may be of any denomination each. At time point 2 trader A interacts with trader B. First trader B verifies the bona fide status of the hardwallet used by trader A—using the contact pad marked at the top of the contact line between the two wallets. To do that trader B either queries a source that stores the public ledger of measurements for the hardwallet used by trader A, or trader B relies on itself having a copy of the public ledger, at least of the part the ledger that includes the hardwallet used by trader A. Once the bona fide status is verified, trader B accepts 4 digital coins from trader A. At time point 3 trader B interacts with trader C. Trader C first verifies the bona fide status of trader B (upper arrow in the contact line between HW B and HW C). This verification follows the same procedure used by hardwallet B to authenticate hardwallet A. Then trader C accepts 3 digital coins from trader B. At time point 4 the payment dynamics continues by repeat of the former protocol, resulting in payer C paying 2 digital coins to payer D. Payer D, at time point 5, runs the trade protocol with trader A, passing to him a single digital coin. This will happen after hardwallet A authenticates hardwallet D. At the end of this sequence the 6 digital coins that were all held by hardwallet A are divided to 3 coins held by A, one coin held by B, one coin held by C and one coin held by D. These 6 coins may be further transacted back and forth throughout the trading community. This transaction regimen sustains itself indefinitely without the service of the Internet.

Figure 3:
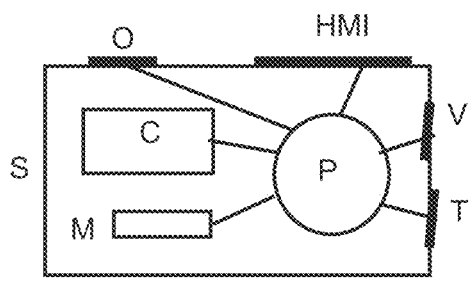

FIG. 3: Hardwallet (TW) Architecture

The figure shows two-ways (TW) hard wallet through its parts. The rock of randomness shell, S is depicted. On it the figure shows O—the biometric implement (e.g. fingerprint), the HMI—human machine interface, where the HW trader communicates with their wallet. It shows the Verification pad, V, through which the HW verifies a payer HW, and through which another HW may verify the bona fide status of the current HW. It shows the transaction pad T through which the HW transacts digital coins with another HW. Inside the shell, the figure shows the electronic processor P that manages the digital operation. It shows the memory location for the money (C) and the memory location for (m) verification information (the HW public ledger), the biometric data, etc. A one-way HW will also be equipped with an optional WiFi element, Bluetooth, or NFC.

Figure 4:
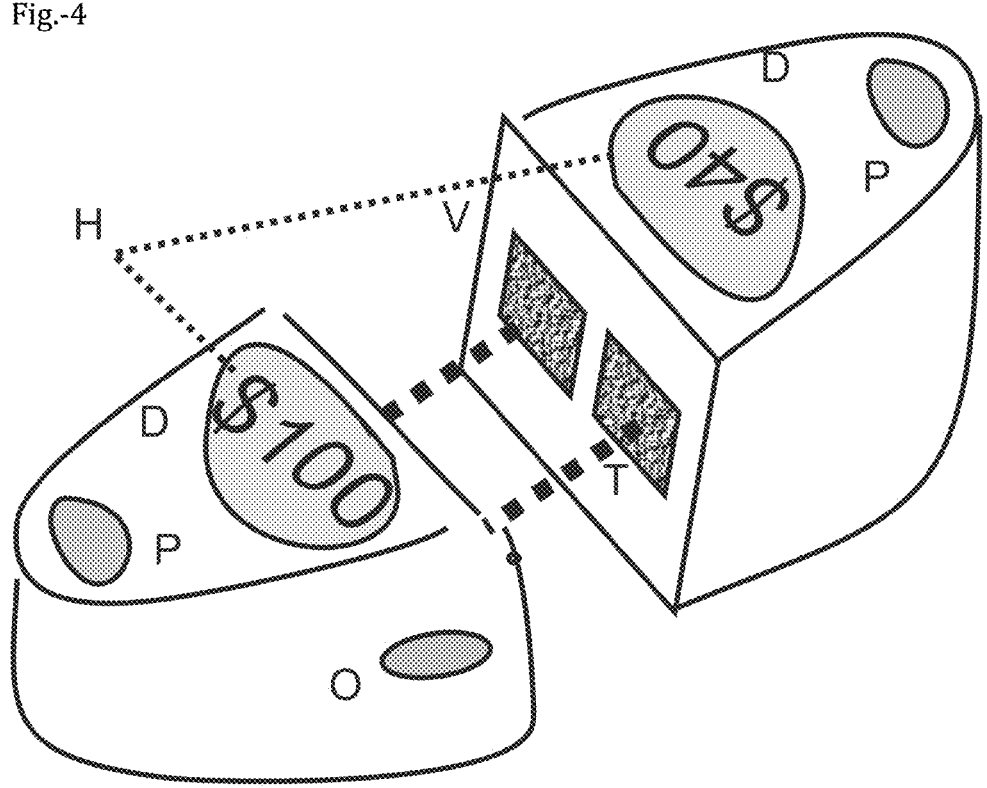

FIG. 4: Two-Ways Hard Wallet Payment

This figure shows two hard wallets configured to touch each other such that the authentication pad (V) and money transfer pad, (T) are aligned so that one HW may authenticate the other, and one HW may make payment to the other. The figure shows the two human machine interface screen (H) where the money content is shown and where through touch-screen technology the HW owner communicates with the wallet. The figure shows the "pay" button, P, on both hardwallets. The design of the wallets may be different from shown, as long as the functionality is maintained.

Figure 5:
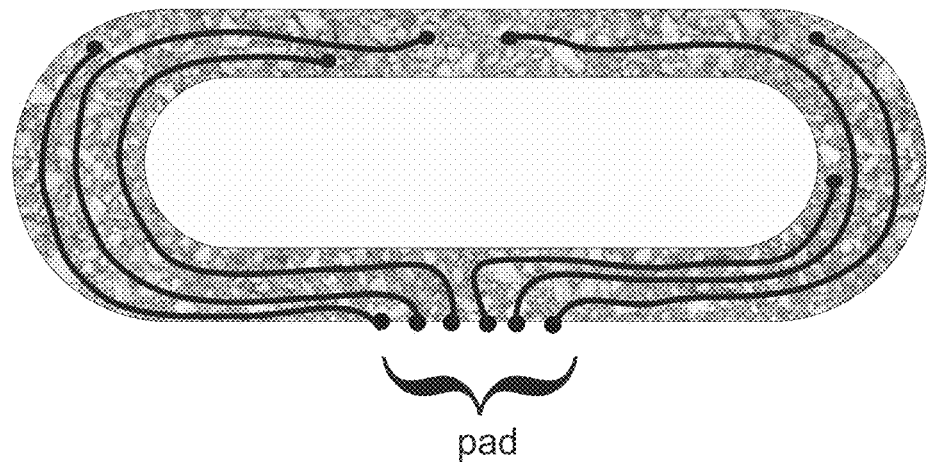

FIG. 5: Conductivity Measuring Points

This figure shows a rock of randomness shell for a HW. It shows the authentication pad at the bottom. The ports on the pad are connected to embedded insulated wires, which terminate with an exposed point at some random spot in the shell. The effective resistance is measured by grouping some ports into one polarity of a battery and grouping the other ports (or some of them) into another polarity, which is determined by the randomized structure of the shell. Any breach of the shell, any deformation thereto will (i) be visible and disqualify the hardwallet, and (ii) will result in measurement figures that will not agree with the same measurements as recorded on the public ledger. The hardwallet shell that looks in tact and generates the expected measurement results will command the trust of the payee.

Figure 6:
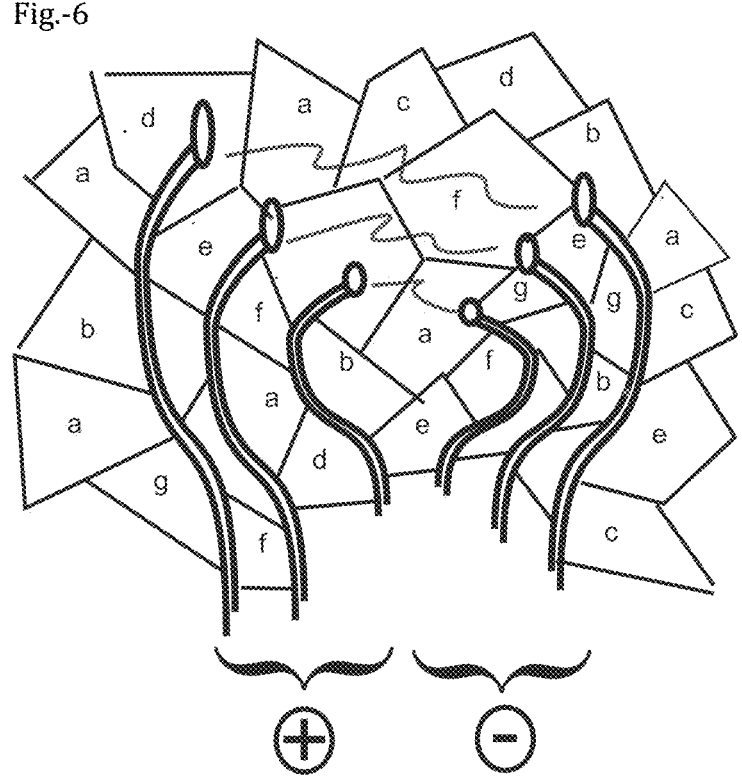

FIG. 6: Randomized Rock Resistance

This figure shows the inside of a HW shell. Three ports are shown on the left, all connected to the positive side of an electrical setting, and three ports are shown on the right, all connected to the negative side of same electrical setting. The voltage difference between these ports creates an electrical current that depends on the location where these ports terminate within the body of the rock (the shell). The ports connect a randomized point in the shell with a point on the authentication pad on the surface of the HW. The connection is via an insulated wire so that all the electrical current is flowing only through the terminal points of these ports. The insulated wires are shown as drawn inside the shell which is comprised of a randomized arrangements of randomized blocks of variable conductivity. The figure shows conductivity materials marked as: a, b, c, d, e, f, g. The current is measured. Its value depends as noted on the terminal point of the participating ports and on the randomized arrangement of the variant conductivity blocks inside the shell. The measured current is compared to a public database (public ledger) of same measurements taken from the same or identical rock when it was manufactured. In some cases a copy of the shell may be kept with the manufacturer, in other cases only the measurements will be kept. The agreement of the current measurement and the manufacturer recorded values serves to authenticate the shell, and hence the hardwallet. If a hardwallet contains n contact points then any combination of p points that are connected to the same electrical pole, versus some q contact points that are connected to the opposite pole, where $p+q \leq n$, will be associated with a particular measurement of effective electrical resistance determined by the randomized construction of the hardwallet shell.

Figure 7:
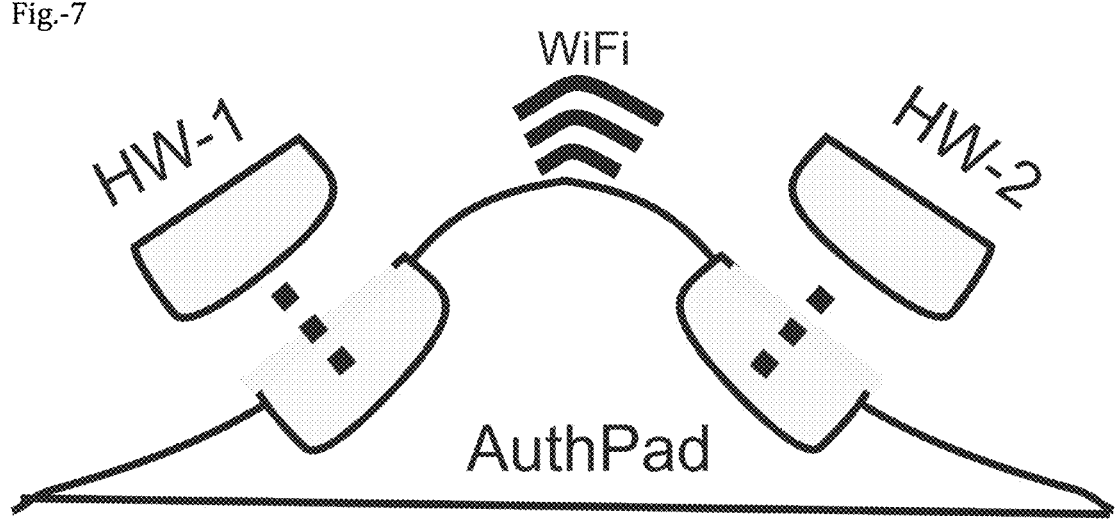

FIG. 7: Independent Authentication Pad

This figure shows an independent authentication pad that authenticates each hard wallet to the other, instead of contact authentication between two HWs. The HW will only have to carry authentication data for the authentication pad, nor for each other. The authentication pad will hold the full ledger of all manufactured HW, The authentication pad may be WiFi equipped to update itself on authentication data. The authentication pad will be shell-protected like the hardwallet (rock of randomness option). The money itself flows through the independent authentication pad.

Figure 8:
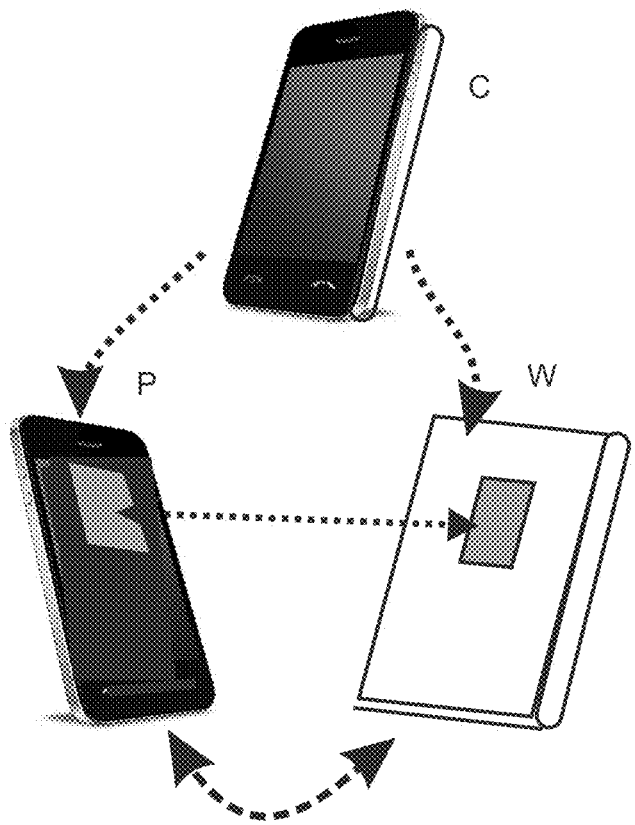

FIG. 8: Hard Phone Wallet

This figure shows a hard wallet fitted into the back side of a smart phone (C). It also shows the phone and the wallet separated (P, W) and the contact pad between them shown. The wallet uses the phone for communication with its owner, potentially for ownership security, too. This connection is functionally protected from abuse of the money in the wallet. The digital money in the wallet will be paid through the pad to a second hardwallet that may be phone connected after the second hardwallet/phone will be validating the identity of the first hardwallet/phone.

Figure 9:
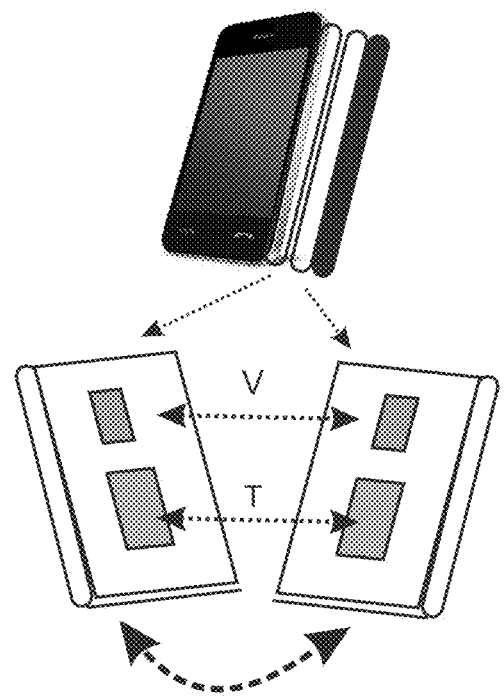

FIG. 9: HPW Payment

This figure shows a payment occasion between two HPW (hard phone wallets) in the form of a hard wallet fitted into the phone. The wallets are matched back to back so that their authentication and verification pads (V) and their transaction pads (T) aligned, so that authentication and transaction can take place.

Figure 10:
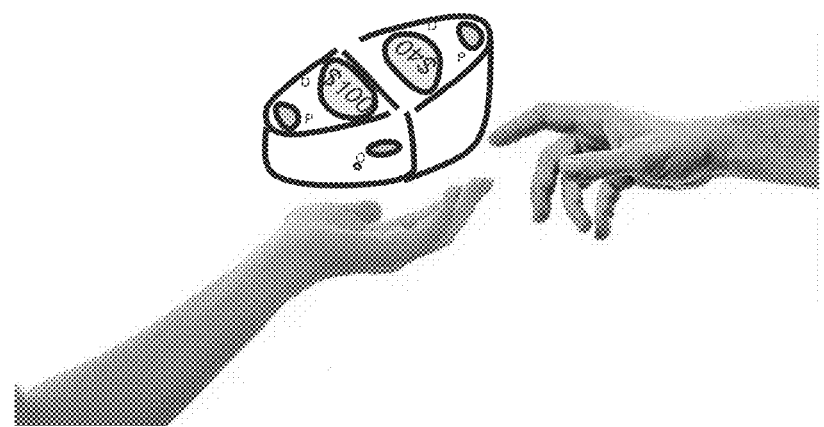

FIG. 10 TW-HPW in Action

This figure shows two TW-HPW linked to cross verify wallet integrity and to effect a transaction.

Figure 11:
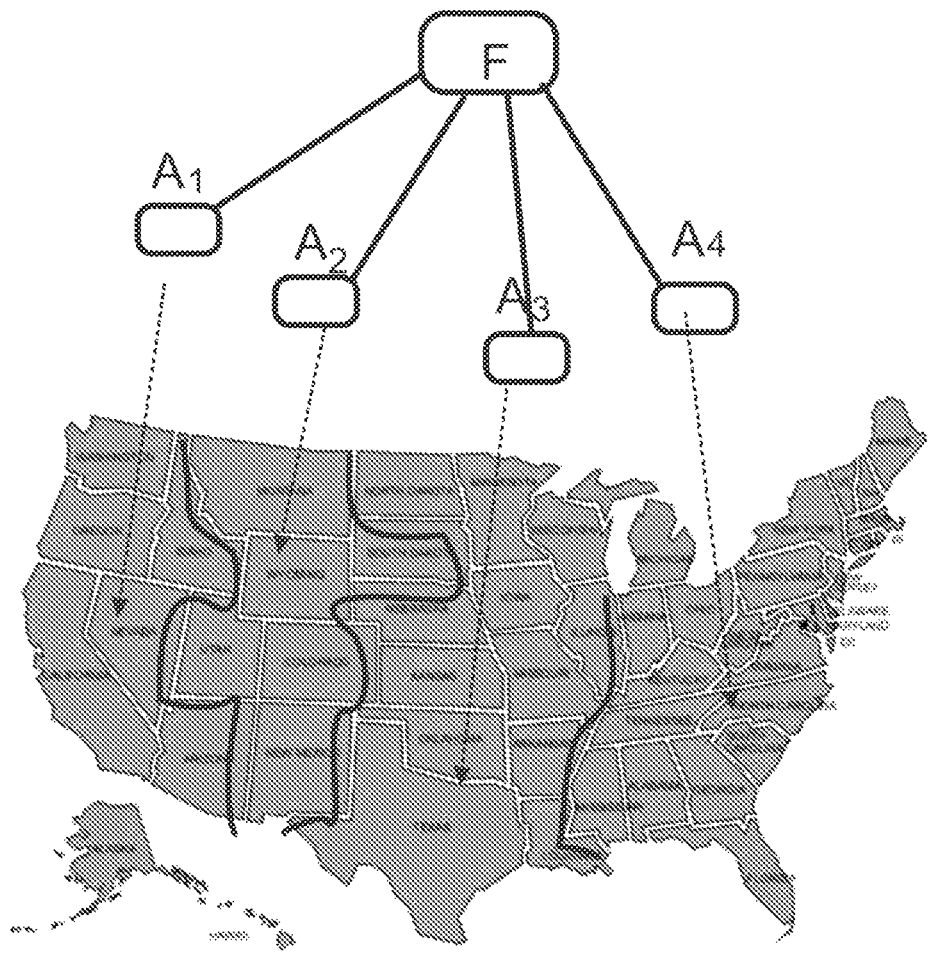

FIG. 11: Regional Distribution of Wallet Authentication Centers

The figure shows the hard wallet factory F disseminating wallet measurements data to four authentication agents $A_1$, $A_2$, $A_3$, and $A_4$ where each authenticator holds data for wallets that are used in a close geographic area. This geographic division makes sense because hard wallet payment requires payer-payee proximity.

Figure 12:
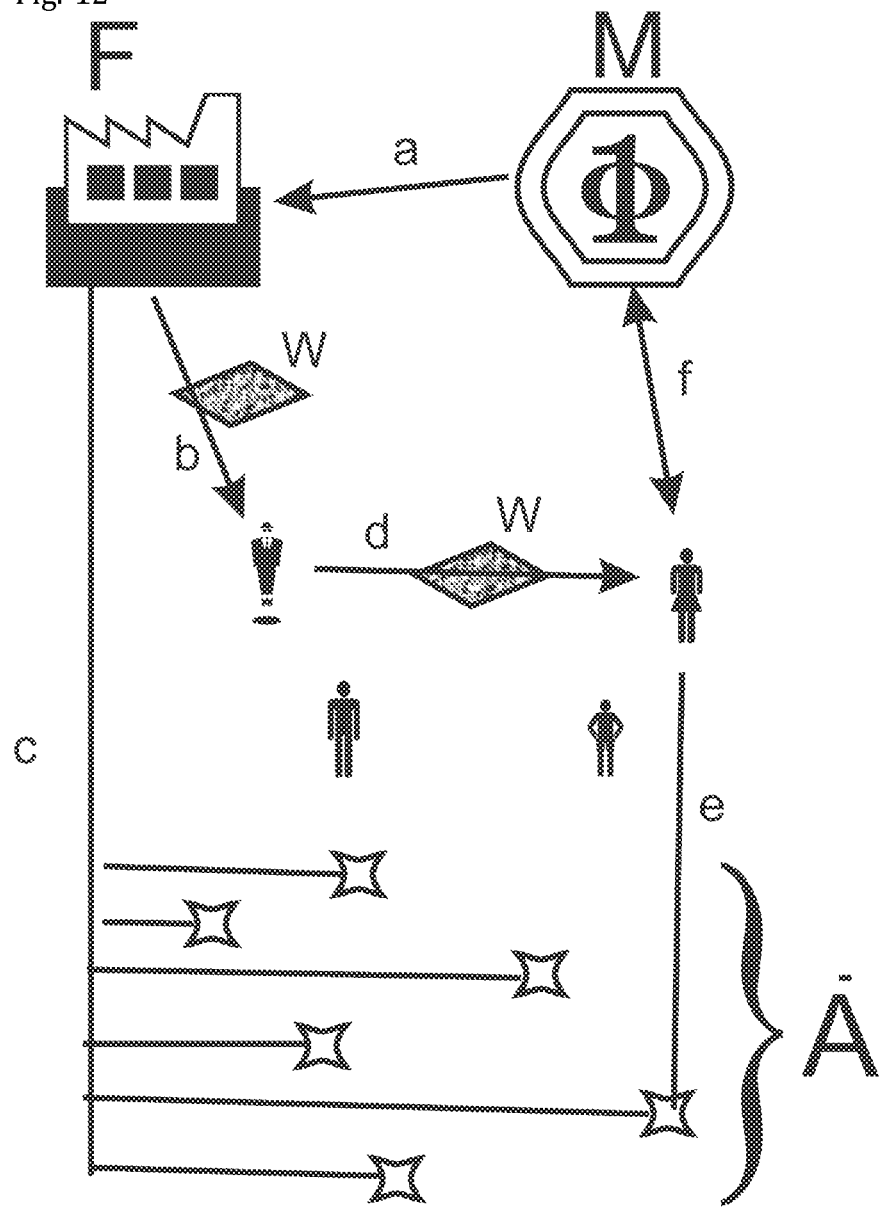

FIG. 12 The Hard Wallet Dynamics

This figure shows the various players in the hard wallet dynamics. The wallet factory F receives digital money from a source, likely a mint M (line a). F then packs digital coins in wallets. The factory will perform measurements on the manufactured wallets, and then distribute this measurement data to a set of authenticators A (line c). The factory will then offer the wallets for sale to the public, as illustrated by line (b) carrying hard wallet W. The buyer of the hard wallet would then use the wallet (W) to make a payment to the payee (line d). The payee will perform authentication measurements on W. The payee will also query an accessible authenticator (line e) for the recorded measurements results for the particular hardwallet W attempting to pay them. When the data from the authenticator agrees with the real time measurements of the wallet the payee develops confidence about the wallet, and by extension, develops confidence over the payment bits. Optionally the payee may conduct another test, with a different measurement of the same hardwallet, and so again, until the payee is satisfied, and trusts the bits paid to him by the payer. Eventually the payee may either pay the bits further or submit them to the mint M (line f) for redemption.

Figure 13:
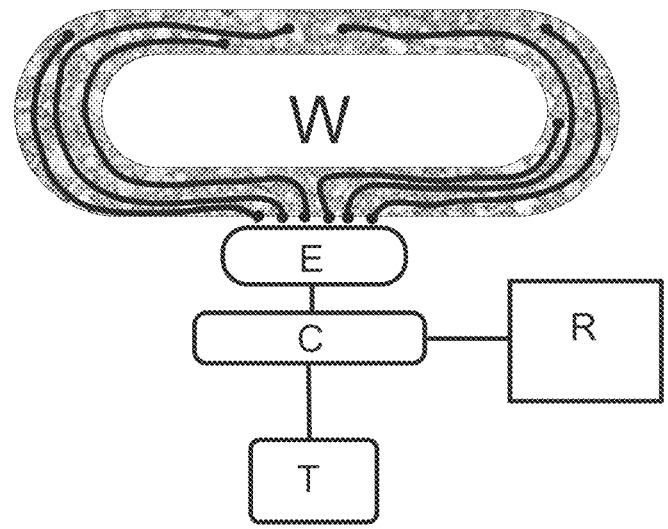

FIG. 13 Hard Wallet Authentication

The figure shows a hard wallet W with a pad of contact points at the bottom. It also shows how a measuring and computing gear is attached to the pad. The contact is made through component E which contains circuitry to effect measurement of resistance between a group of p contact points on the pad connected to one battery pole, and a different group of q contact points connected to the other pole. The respective resistance is computed by dividing the applied voltage to the recorded current. The result of the measurement of the E component is delivered to component C which is the computing component. C queries its connected memory location R where measurements of various hard wallets are kept, and retrieves from R the pre-recorded measurement of exactly the same hard wallet over exactly the same grouping of p contact points and q contact points. The computing component C then compares the results retrieved from R with the results communicated from E, and if they agree the computing device makes a note of it. If they don't agree the computing device signals to the testing center T that the test has failed. If there is agreement between the recorded data and the data measured by E, then C may conclude that with high confidence the measured hard wallet is exactly the one that was manufactured and recorded in R. Otherwise the computing device C may decide to run another test, namely to select a new group of p contact points on the pad, and a different group of q contact points on the pad, and communicate the new selection to the E component, while querying R for the respective record to again be compared to the measurement. C may decide to keep testing the hard wallet per all the instances recorded in R, or it may terminate the series of tests at some point. The more tests that agree the greater the confidence that the tested hard wallet is genuine.

Figure 14:
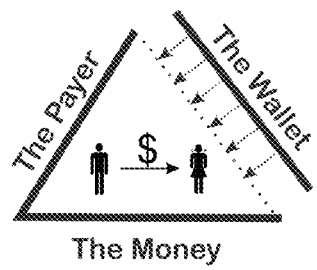
Figure 14:
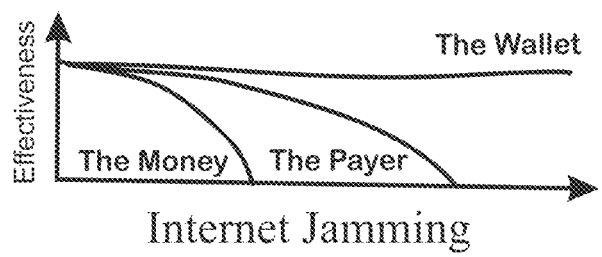

FIG. 14 The Transaction Authentication Triangle

This figure shows on top the three possible ways to authenticate a transaction: based on the transacted money, based on the identity of the payer, and now a third one: based on the wallet. The part below shows how under conditions of increasing congestion of Internet communication the money authentication loses its efficacy first, then the payer based authentication, and all the while the wallet may be used indefinitely.

OFFLINE HARD WALLET PAYMENT

Digital Payment without network communication.

No Internet, Yet Sustained Payment Regimen Between Randomness-Verifiable Hard Wallets Identity-bearing digital money (e.g. BitMint) can be paid in a private transaction between payer and payee without reliance on network authentication. The payee must trust that the paid digital coin is bona fide. The invented hard wallet (HW) will generate the required trust. Payment issued from the HW can be taken in by a second hard wallet, which will further pay to another hard wallet, creating a payment ecology of digital money for long periods without the benefit of a communication network. This off-line payment mode is applicable to fiat currency, loyalty money, or private money. Payment may be tethered to eventual terms of redemption. The hard wallet may be personalized—fitted with ownership security capability. The HW may be engineered in conjunction with a smart phone, so people can use a single device as a phone and as an off-line wallet.

INTRODUCTION

Both legacy money and peer-to-peer money are network dependent. A transaction occurs between a payer and a payee, authenticated by a network authentication agent. When the network is absent, or seriously jammed, payment stops. Since payment flow is the blood flow of the body of society, it is important to insure uninterrupted payment regardless of the availability of a communication network serving as a payment authentication agent.

In a tight trust-bearing community such payment can be carried out on the basis of the prevailing trust among members of the community. Trust may be extended via insurance, but a robust payment regimen must allow two strangers to pass money to each other in a trustworthy manner.

The idea raised here to enable such a network-absent transaction is anchored on the notion of the Hybrid Coin (U.S. Pat. No. 9,471,906). A physical device that upon inspection by the payee, it generates trust. This physical appearance based trust is the traditional mode of payment for thousands of years before digital money. Payees rubbed banknotes, checked them up towards the sun; coins were bitten to assert their metal constituency, and gold was tested to withstand acids. The hybrid coin, though, is a holder of digital money, denominated as a fixed sum inscribed on the surface of a physical device, where by passing it, payment is done. The physical integrity of the coin is the basis of its projected trust. The payee could hold the hybrid coin, or passing it further, or they could crack the shell of the coin, take out the electronic device with the digital bits on it, and incorporate these bits in a digital money environment.

The add-on of this invention is to build a device that is upgraded from a coin to a wallet. Namely a physical device that would contain a certain amount of digital money, X, and would pay an amount Y which ranges from some minimum amount to X: $0 < Y \leq X$. Upon examination of the wallet, to be regarded as "hard wallet" (HW), the payee will trust the digital money passed to them from the wallet.

In its basic mode, the HW is one-way. It pays out pre-installed money, but it cannot be reloaded. In the advanced mode the HW will operate two-ways. The idea: if a nominal payee can trust money dispensed from a HW, then a second HW will also so trust. So it is sufficient for a payee HW to confirm that the source of the money bits is another trusted HW, for the payee HW to trust those money bits, and therefore use them as payment, much as the pre-loaded bits are used for payment. In other words, the two-ways payment mode is based not only the singular trust of the one-way paying HW, but on the combined trust of all the participating HW where the money was flowing in that off-line mode.

So in summary, the digital money stored in the HW will be either (i) placed in the HW by the wallet manufacturer, or (ii) passed to the wallet from another qualified hard wallet.

The community-trust HW payment option leads to a gathering of mutually mistrustful parties, each holding a HW, allowing for any which way payment to support normal societal activity, and all that through periods that may be quite extended when for whatever reason the Internet is not readily available. This off-line payment mode is the missing ingredient on the road for worldwide adoption of digital money in the framework of national fiat currencies. However, it is also a necessary ingredient in the ecology of loyalty money or private currency issued on limited basis.

Since a wallet is an essential take-along device, and so is the phone, then it makes great sense to engineer them jointly. This option is addressed herein.

Ahead we describe (i) architecture, (ii) dynamics, (iii) construction, then discuss tethering, loyalty money application, a Hard Phone Wallet.

Hardware Integrity Technology Options

This invention has two elements: innovative technology to secure physical integrity, and innovative applications to use such technology. The two elements may be regarded in separation. So while the description of the applications regards particular hardware integrity technology, it can be exercised with different technologies.

Here below we survey the technologies considered for hardware integrity. We distinguish between (i) hybrid coin technology, U.S. Pat. No. 9,471,906 (ii) tamper-resistant technology (U.S. Pat. No. 10,445,730), and (iii) "Rock of randomness technology (U.S. Pat. No. 10,467,522). Their cost is different, their efficacies are different, and one should match the technology to the application, to the denomination of the coin, and to the risk environment.

HW Ecology

HW payment is seen on one hand as a replacement for customary cash payment, and on the other hand as a payment continuity solution for periods (which may be extended) when no network connection is available at the required level.

Much as in the original days of paper money when it was a claim check against gold, so the HW paid digital money is regarded as a claim check against the more common, more historic form of money. Cash payment was traditionally anonymous payment. So it is, or may be, if so designed, for the HW payment. The payee may not care who the payer is, he only cares that the money paid is bona fide, in other words, is redeemable for more legacy cash.

For OW HW (One Way Hard Wallet) the cash payment is terminal, when all the wallets are empty, there is no more activity. But with TW-HW (Two Ways Hard Wallet) the trade can go on forever, as long as the traders have confidence that the transacted digital money is eventually redeemable at par value. It is important to note that HW payment is well fitted into a global digital money ecology, in particular money that bears identity.

The ecology where HW payment is happening depends on the money used. If used for generic fiat national currency, then the range of payment is world wide, in the most general sense, and in that case HW payment is very much like cash.

If used for tethered money then the tethering features may restrict the trading community. Say only members of a club or of a given community can redeem the money, and then the payees will be limited de facto to this community. If the HW paid money is tethered to be redeemed only by grocery stores, then the payees will be restricted to those who wish to use the money for groceries.

Tethering may impose complicated and abstract restrictions. If the HW paid money is only redeemable after a certain future date then, the trade is limited to people who can forgo redeeming the money in the present. If the money is redeemed upon the occurrence of certain future conditions, then the trade is limited to risk taking investors.

When HW is used for loyalty money, then it is limited to the loyalty circle. If the loyalty money may be reverse converted to generic cash, then the loyalty money has characteristics of fiat currency.

One-Way Hard Wallet (OW-HW)

A one-way hard wallet (OW-HW) is a physical device pre-loaded with a sum of digital money, X, equipped with a mechanism to pay off successive amount $Y_1, Y_2, \ldots Y_n$ where:

$$Y_i \leq X - \Sigma Y_j, \ldots \text{ for } j=1,2, \ldots (i-1)$$

for i=1, 2, . . . n.

The payment can be carried out through any means used to transfer digital money. The payer is the HW, but the payee may be any device, or facility fitted to accept bit-wise money.

The payee will be given the opportunity to examine the HW, be satisfied of its bona-fide, and accept the passed bits as due payment. Eventually the paid digital money will be submitted for redemption at the redemption center. If it turns out that the bits do not represent good money then, the payer will be subject to criminal investigation like any money counterfeiter.

The OW-HW cannot be reloaded. Once all its pre-loaded money is exhausted the HW can make no more payments.

Architecture (OWHW)

The OWHW system is a configuration of the following items:

1. The HW capsule 2. Authentication Pad (optional) 3. Payee device.

The HW capsule is comprised of:

1. HW Shell 2. Internal Electronics (data storage, processor) 3. Payment Ports 4. Human-Machine Interface (HMI) 5. Battery Pocket, standard battery, or recharge port. 6. Ownership Security features (optional)

The HW operation relies on the integrity of the shell, and the trust it generates. Such trust may be based on physical examination, as the case is with the hybrid coin, or it may be based on a sophisticated test of integrity and validity conducted by the authentication pad, on which the HW wallet is laid (or which is fitted into the HW). The connection between the HW and the payee device may be physical or through any short range electromagnetic communication (e.g. NFC, Bluetooth, WiFi). Alternatively it may be carried out through screen picture (QR or barcode). The HW will erase the paid digital coin from its memory to prevent any possibility of double payment. The money is kept in permanent (e.g. flash) memory so it retains its value even if the battery is removed.

The HW may include any of the tamper resistance measures mentioned in U.S. patent application Ser. No. 15/293,352 (now U.S. Pat. No. 10,445,730), or others. However, by immediately erasing the money bits that are paid out, any physical compromise of the HW will not enable double payment.

The shell is fitted with a human machine facilitation (Human Machine Interface) where the owner of the wallet may both read the digital content of the wallet, as well as any relevant information, and at the same time, the owner can tell the wallet to pay any amount available in its memory, and otherwise communicate with the HW.

The wallet, optionally can be fitted with ownership security features designed to insure that the wallet will only be used as a payment source by its rightful owner.

Payment Dynamics (OWHW)

We consider a payer holding a OW-HW and a payee holding a payment accepting device, geared for digital money. The two parties agreed on a sum Y to be paid from the payer to the payee. They decide to exercise the payment off-line.

The payer will pull out the HW and present it to the payee. If the sums are sufficiently small, then the payee, upon cursory physical examination of the wallet will agree to consider payment from it, as bona fide. The payer will show on the HMI screen that the wallet contains money in the amount X≥Y, and so it may serve as a bona fide source of payment. In other modes the payer does not have to expose the value of Y. The payee will check to see if they got the expected amount Y, once it has been transferred to them.

If the HW is fitted with anti-theft ownership security features, then the rightful owner will activate these features, to activate the HW. If the HW holder fails to satisfy the ownership security features, then the HW does not dispense money.

Next the payee will use the HMI interface to set up the payment action. The payee device will be set up to receive the money and OK to the payer that the payee device is set, then the payer will click the pay button on the HMI, and the wallet will dispense the indicated sums through the chosen communication channel to the payee device.

The payee will find out from their device that the money has been paid, report this to the payer, and the payer will so indicate on the HMI, and in response the electronics inside the HW will erase the bits corresponding to the paid amount. Alternatively the money bits can be erased as soon as they are communicated outside the HW.

In the event that the sums involved are large or otherwise the payee is not comfortable accepting the risk of physical examination of the wallet as described, then the payment will require a technology based authenticity test. Upon its satisfactory execution the transaction will be carried out.

In the case where the wallet is fitted with ownership validation means, then they would have to be activated and allow the wallet owner to operate.

This nominal payment dynamics may be extended to automatic payment.

It is very important for the HW to erase paid money bits (payload). This will de-motivate anyone from cracking the HW and double spending the money in it. In most protocols the paying HW will wait for the recipient device to OK the reception of the money, but such may be skipped, for certain versions of the protocol. A recipient device may fail to OK receipt of money, or the transferred money bits will be taken in by a device that is not a wallet. In that case the device may register the sent over bits but will be unable to process them and verify that those bits constitute a valid digital coin according to the protocol of the mint of that coin. In BitMint, for example, the digital coin has a well-defined structure and a distinction between meta data and payload data, and every wallet software will recognize a BitMint coin for what it is. However, a bit recipient which is not a wallet will not be able to recognise the coin for what it is, and hence will not be able to OK the payment to the payer HW. The payer HW will nonetheless erase the paid bits to absolutely prevent double spending.

Automatic Payment

The OW HW may be fitted to dispense money automatically. A payment management software will dictate successive amounts $Y_1, Y_2, \ldots$ to be paid per controlling events. Such events may be a simple passage of a time interval, like in paying for parking or for time measured services, or they may be specified events that the payee is undergoing or the environment is undergoing. The idea here is that the payments are carried out fast over an established channel. In some application payment may be effected through just erasing of money bits without passing them out to anyone.

In a nominal mode payer and payee will cooperate in a dialogue as discussed above, for any passage of money. In the automatic mode the dialogue will be established once, and then the money will flow as the events dictate.

Payment Channel

The actual payment dynamics will depend on the channel chosen to effect the coin delivery. We discuss: (i) hardware connection, (ii) Bluetooth, (iii) NFC, (iv) Camera-QR.

Hardware connection may be accomplished to standard USB and micro USB ports, or through specialized ports. It may be accomplished through direct touching or through connectivity pads on payer and the payee device, or it can be done via a connecting cord. The passage of the digital coin may follow any common relevant protocol. Same for the Bluetooth, the NFC and the camera readout. The industry developed standard communication protocols for each mode.

Construction (OWHW)

We discuss construction of the OW HW elements:
1. The HW capsule 2. Authentication Pad (optional) 3. Payee device The hard wallet will accommodate all common means for passing bits, so all money handling computing devices can serve payees in this context.

The HW Capsule

The HW capsule is comprised of:
1. HW Shell 2. Internal Electronics (data storage, processor) 3. Payment Ports 4. Human-Machine Interface (HMI) 5. Battery Pocket, standard battery. 6. Ownership features (optional)

The Hard Wallet Shell

The Hard Wallet Shell is the trust generating element in the hard wallet. Simple versions, use the Hybrid Coin technology (U.S. Pat. No. 9,471,906), extending its use from a coin of fixed denomination to a wallet from which money can be paid in any amount up to the contents of the wallet. The idea being that any attempt to crack the shell will be noticed by the payee. In other words, the assumption is that it would be too difficult, too costly for a fraudster to either crack the wallet, or otherwise tamper with the content. The next level is the technology identified in U.S. Pat. No. 10,445,730, where any optional combination of light, pressure and internal composition of a gas, will erase the data upon tampering, and no payment can be made.

The higher up mode is based on the rock of randomness technology identified in U.S. Pat. No. 10,467,522 and in U.S. patent application Ser. No. 16/578,341. This technology is further innovated to establish high level of security and integrity (and hence trust) for the wallet.

Rock of Randomness Shell Technology

One constructs the shell according to the technology identified in U.S. Pat. No. 10,467,522 namely as a randomness guided 3D printed combination of conductivity-variant elements. At one flat location on the shell (from the outside) a plate is fitted with t ports. Each port is the end of a highly conductive well-insulated wire that is fitted inside the shell layer and ends at a random location inside that shell, where the wire is exposed (no insulation on the end point of the wire). The wires may either be fitted as part of the 3D printing of the 'rock' or threaded in after the rock is 3D printed. The wire connects between a port on the surface of the shell, and a randomized location in the shell, where the wire terminates.

So fitted one could randomly pick p<t ports and attach them to one pole of a battery, then combine other ports, one, or up to all the remaining q=t−p ports and attach the picked ports to the other pole of a battery, and thereby measure the effective resistance between these specified two groups of wire terminal points spread throughout the shell of the HW. The shell is identified with a unique ID affixed to it by the manufacturer. An authentication agent can compare the resistance reading from the shell to a reading of the same as registered in a ledger prepared by the manufacturer of the shell. If the two readings data agree, then there is a high likelihood that the measured shell is the shell that was manufactured and documented as to per its various conductivity readings from various combinations of ports. To increase the likelihood for a bona fide, non counterfeit shell, one would pick another combination of p' ports and a respective combination of q' where q' is comprised of one port up to q'=t−p' ports, and compare again the actual reading of the shell to the recorded matching reading issued by the manufacturer. The manufacturer publishes the ledger while the Internet is on and working. The HW and any other computing devices, like the authenticators, all download the master file, the ledger published by the manufacturer, and this copy of the ledger they use it to confirm HW (shell) identity in periods without a functioning Internet.

To exercise this test one in one mode, uses an authentication device (authentication pad). This pad, operates as described in U.S. Pat. No. 10,467,522. Namely it has a computing means to communicate via WiFi with the manufacturer, and query the manufacturer as to particular conductivity reading of a particular shell. It also stores a copy of the manufacturer database (ledger) which features assorted conductivity readings of each of the shells manufactured by the manufacturer. Owing to this pre-stored database, the pad can compare the reading done over a given shell to the readings stored in tis memory and if they check out, to issue a statement of authentication.

HW Internal Electronics

Inside the shell there is (i) a permanent bit storage device, e.g. flash memory, and (ii) a processor. The memory holds the money bits, and auxiliary data. The processor has read/write access to the memory element, and it has access to the ports of payments through which the money bits flow to the recipient. The processor also is communicating with the HMI interface to (a) report to the wallet operator, and (b) accept payment instructions and other instructions from them. If Ownership security elements are installed, the processor connects to them too, and will only operates if the security check if positive.

The money flow may be fitted to be any method by which bits are transferred. For example, but without limitation:

1. USB, or any other standard physical port. 2. Bluetooth 3. NFC 4. Camera read through the HMI.

Payment Ports

The payment ports may be set as any means by which bits may be communicated. In particular, without limitation:

1. USB or similar physical connection. 2. Bluetooth 3. NFC 4. Camera-Readable Bit-Wise graphics (through the HMI screen)

These established communications can be installed and practiced through their common protocols.

Human-Machine Interface

The Human Machine interface (HMI) element will be following the common practice of smart phones, where the screen is used both as mode of data entry and mode of data display. Used for the wallet operator to give payment instructions or other instructions, and used for the wallet to report the amount of money available at any moment in the wallet, as well inform the operator on any related aspects. In particular, if the money in the wallet is tethered and the request for payment does not satisfy the term of payments. The wallet will keep track of its activity. How much money was paid when, and if known, to whom. Using the BitMint money protocol, the HW will retain the capsule of the coin, namely the coin metadata (while the payload, the actual money bits are erased once paid).

Authentication Pad (Optional)

The authentication pad applies for shells based on the 'rock of randomness' technology. These shells will have a tablet displaying an array of contact points (conductivity measuring ports), where each port is the end of an insulated conductivity wire, which terminates somewhere inside the 'rock material' of the shell. The tablets with the n contact points is fitted over the authentication pad which is fitted with a matching array of electrical terminal points.

The tablet on the shell also includes an ID terminal, identifying electronically the identity of the particular shell. The tablet on the pad has a matching reader terminal to read the ID of the shell.

There are there types of authentication pads:

1. online authentication pad 2. off-line authentication pad 3. on-and-off line authentication pad The online pad has an online link to the HW manufacturer database. Based on the pad reading the shell ID, it queries that manufacturer database to receive a conductivity reading based on some chosen combination of p conductivity port (out of the array of n) to be assigned to one electrical pole, and the combination of the remaining q (where q comprises 1 port up to q=n−p ports) conductivity points (ports), grouped into the opposite pole. The authentication pad will then measure the conductivity of the shell with the same pole (electrode) grouping. If the result is a match then the shell is declared authentic. The pad will have an authenticity indicator to light up to communicate this conclusion. This indicator can be in a form of a light—green for Ok, red for not-OK: fraud suspected.

The off-line pad will have to be pre-loaded with the manufacturer database (ledger) where the full set of wallets that have a chance to be engaged at that location, is identified, each with its own ID and a series of conductivity measurements based on some particular grouping of the n conductivity ports. Reading the ID of the wallet submitted for authentication, the authentication pad will query the downloaded database for conductivity data for that ID, and again compare the stored results to actual measurement of the wallet submitted for authentication. The report likewise, will be submitted via the authentication indicator. If the ID of the submitted wallet is not found in the downloaded database, the pad will indicate: "cannot authenticate the submitted wallet".

The on and off line pad, will operate online if online connectivity is available, and will resort to off line mode otherwise.

OW-HW Security

OW-HW security may be viewed from (i) the payee stand point, and (ii) from the HW owner stand point. The payee is only interested in the question of whether the money paid to it is bona fide. This assessment will be made by the payee based mainly on the sum paid and on the hardware security grade. Small daily amounts are a good risk to be taken from low level HW since the effort to forge such a wallet is greater than the transacted value. For higher sums, a higher degree of HW integrity will be required. The rock technology is considered sufficiently secure to guarantee the bona fide status of even millions of dollars HW paid.

The security considerations of the HW owner are different. Since HW payment needs to be paid while exposing the wallet, the owner stands the risk of being robbed. The security answer to this risk is combined ownership verification features.

We distinguish between (i) biometric security, (ii) PIN security, and (iii) ledger security.

Biometric security is any biological signature of the owner. E.g. finger prints, facial recognition, iris, palm, etc. There can be a few of them in either "OR" or in "AND" mode.

The PIN security is based on entering a secret PIN. The PIN can be a fixed string of bits, or it can be dynamic. For example it can be time dependent: every day it changes, and the owner needs to memorize the new PIN every day, based on applying a secret app on his phone or computer.

Ledger security is based on the HW ledger identifying not only the conductivity readings (in the Rock technology) but also the owner of the HW. The payee will then ask the HW holder to identify himself per the indication on the ledger.

Any combination of these features is acceptable.

The selected security features will be built into the shell of the HW.

The HW is programmed to erase the money bits after paying them, so that any one who cracks the shell will not be able to make a double payment from money that was already paid. In the BitMint format the HW may keep the coin 'capsule' for any paid digital coin. The capsule is the full meta data of the coin, in fact, all the data of the coin except the payload. This way the HW keeps a full record of its payments over time, but keeps no copy of money that was paid once, denying a shell breaker the opportunity to profit from double payment, and hence deny him the incentive to crack the HW shell in the first place.

Biometric data of the owner may be entered once, when the owner first receives the hardwallet. That data is then kept inside the HW and cannot be changed, to enhance security.

Two Ways Hard Wallet (TW-HW)

In the one-way HW mode, the wallet cannot be recharged. Its content is drained until it is empty. It would be much more viable to exploit the deep trust engendered by the hard wallet to practice a two-ways transaction mode.

In the one-way mode the recipient, without a HW will trust the money bits passed to them from a one-way HW on the basis of trusting the physical hard wallet. But these bits once held outside a hard wallet, cannot be simply paid to a stranger under conditions of no-network. BitMint developed means for off-line payments that involved cryptographic trust mechanism, but they are involved, and require payer and payee to come from the same trading environment where these means are accepted and recognized. They also operate for a limited period of time. When it comes to a general transaction between complete strangers, the payee is worried about (i) the authenticity of the passed digital coin and about (ii) whether some double spending is involved. This apprehension is calmed down when the payer is a HW, but when the payee of a OW-HW tries to use the money given to it, for its own payment, then the new (2nd) payee re-emerges with the above mentioned apprehension because the paid money is not secured in a HW. This means that in a trading community, once the money stored in a set of OW-HW is paid out, then no more ready payment under no-communication regime can take place. Say then that a OW-HW runs its course when all wallets are empty, and if the network is not back by then—trade stops.

This terminal status of OW-HW is a fundamental issue. The two-way mode is designed to resolve it. A two-way HW is built much as a OW-HW is built only that it allows for re-loading. This re-loading will be allowed only if the incoming money will enjoy the same security projected on outflowing money. This equivalence of security can be achieved by limiting the source of the incoming money to be an equally secure HW wallet. In other words, if the rock technology is good enough to convince a stray payee that the money that is coming out of a HW is bona fide then it is also good enough for a HW to accept such money coming directly from a similar HW unit.

All that is needed is for the payee HW (the reloaded unit) to make sure that the source of the inflowing money bits is no other than a similarly secure HW. To achieve this confidence by the payee HW, it would be necessary for the payee HW to ascertain the HW status of the payer. This can be done either (i) directly, or (ii) indirectly—using an authentication pad.

Direct HW2HW Authentication

The two involved HW will be physically connected via an array of s electronic ports. n<s of these ports will be the rock conductivity ports, and the remaining m=s-n will be used to transfer money and data.

In one design out of many, the connection will be facilitated via a connection pad fitted on the back of each TW-HW. The two HW will be placed back to back. The following will happen:

1. The payer HW will send the payee HW (i) the ID of the payer HW, and the amount of money it wishes to pay. This information can also be passed via bluetooth or other means.

2. The payee HW will consult its built-in, previously loaded (or real time loaded, if the network is operational) ledger of ID data, and pull out of it, conductivity data with respect to the identified payer ID. The payee HW will pull first one recorded resistance, (conductivity) measurement, R(p,q), where R is the measurement per a particular selection of p conductivity ports and q conductivity ports, where p+q≤n the full range of conductivity ports. The TW HW will have the built in circuitry to conduct a live measurement of the conductivity reading per the identified p and q ports off the payer HW. If the readings don't match—the dialogue is terminated. If the readings match then the payee HW is developing confidence that the device attached to it, ready to make a payment, is indeed the HW it claims to be. The payee HW then signals to the payer HW: 'exercise payment!'.

3. The payer HW will then send the money bits and any related information per the particular protocols. These bits and information will flow through the m ports on the pad.

4. For the payer's HW, this payment is no different than payment to any payee device. But for the payee HW, this incoming money is now added to the sums previously stored in the payee HW, only that a record is kept of the ID source of that money (along with timing, and perhaps location information—of GPS data is available).

The just added money is now imbued with full trust because the payer HW was duly authenticated. That means these money bits can be paid out with the same reliance and confidence as the pre-stored moneys. Optionally the data regarding the chain of holding HW devices may be kept.

Note that for this direct mode to work the HW will have to house the HW resistance readings ledger. Also note that the authentication protocol may call for two or more different resistance readings with different combinations of p and q ports.

TW-HW Security

Security for TW-HW follows the logic and the features, of the OW option. In addition the TW version has a verification and authentication pad to allow a 2nd HW to verify and authenticate a payer hard wallet, (1st HW), and also allow a third HW to verify and authenticate the $2^{nd}$ harwallet, and so on. If an intermediate security pad is used it will also be rock-of-randomness protected. So each hard wallet will trust the other HW through trusting the authentication pad.

Hard Tethered Wallet (HTW)

Both the one-way and the two-ways modes for hard wallet operate in the basic mode on untethered money. Namely the owner of the money in the wallet can pay to anyone, anytime, for any reason, like any money owner. This technology can also be used to handle tethered money, namely money that can be paid only subject to preset restrictions.

The payment restrictions (the money tethering) will be inscribed in the wallet to insure that any payment is carried out in compliance of the pre set restrictions. (The money will not be eventually redeemed if the tethering terms have not been complied with). Nominally tethered digital money is controlled through its redemption process, where the redeemer will only redeem a submitted digital coin, if it satisfies the tethering terms. However the hard wallet is designed to work in conditions where the network and hence the redeemer are not accessible, and therefore the enforcement of the tethering is left to the hard wallet. That means that the payer HW will dispense of the money only if the payee HW has supplied proof or indication that it is wallet eligible to receive the tethered money. This will require an additional dialogue between the payer and the payee HW.

Loyalty Money: Merchants could choose the HW technology to dispense their store loyalty money. The HW can be given anonymously, and it can be given to customers to auto-pay. The HW may be latched to a payment pad on a 'wall' where the money will be quickly paid without any need for online authentication which may slow things down. This "pay into the wall" idea can be used for after hours purchases from a side wall exposed to the public. Payment will allow a cell door to open and for the merchandise to be picked up.

Crowd Movement Payments: The HW may be used by a flow of people going into a train station or alike. They will attach the HW to a payment pad on a wall and pay cash like in great speed.

Hard Phone Wallet (HPW)

The hard wallet may be combined with a smart phone to construct a unit that is both a smart phone and a hard wallet. This will spare users the need to hold and take along two items. The Hard Phone Wallet (HPW) will function as both a phone and a wallet. The rich phone interface will serve the wallet for all transactions. The integrity of the physical unit will generate the necessary trust to spur back and forth payments.

An HPW may be constructed using the Hybrid coin shell technology, for small amounts of money. But it can be constructed with 'rock' technology to turn the phone into full fledged secure banks. The HPW may be built in (i) the inclusive mode and in (ii) the latched mode. In the former case the secure shell will engulf everything except the display and communication screen. In the latter case the wallet will be the shell-secured unit, latched permanently or not, to the phone back to back. The wallet and the phone will be communicating with each other through a communication pad fitted with communication ports. That way the screen of the phone can be used to communicate with the wallet.

The HPW will have its own authentication pad built in, as described in the TW-HW, so that one HPW can securely pay to another HPW, and a full ecology of payment can be practiced, all the while without the benefit of a communication network.

Anonymity Advantage

Hard wallet based payment is conducted without exposing the payer. It is based on information regarding the wallet, not on information regarding the owner of the wallet. Therefore HW payment may be considered most closely resembling cash payment. And because of the high security of the technology such payment may range towards very high sums. It will come useful for delicate issues. For example: a customer wishes to get expert advice on a delicate issue without exposing his or her identity. Using the hardwallet, the customer (or patient as the case may be) will attach his or her hardwallet to the money receiving device run by the service provider, and the money bits will flow at a given rate per minute. When the session is done, the customer/patient disengages his or her hard wallet and leaves. The service provider is assured of his payment without knowing who paid him or her.

Another example applies to renting an appliance or an instrument, or a tool. A bicycle for rent will have a socket to accept hard wallets. The renter will OK the hardwallet to pay at a certain rate per minute. The money reception apparatus on the bicycle will authenticate the hard wallet, then receive money on a pay as you go basis. When the bicycle is returned the renter removes the hardwallet and leaves. The bicycle owner is assured of getting paid, but the renter remains anonymous.

PIN Activation

On top of the biometric security, or instead of it, a hardwallet may be fitted with a PIN activation mechanism. No payment is conducted without entering a secret PIN that was used by the trader who first received the hard wallet from the factory. The PIN can also be used for Alice to mail Bob a hardwallet. When Bob confirms reception, Alice reveals to him the activation PIN. It will be pointless for a thief to steal the wallet without the PIN, and the PIN itself will not be useful when the hardwallet is in the hands of Bob, who would probably presently change it.

Hard Output

The hard wallet is a trusted apparatus that extends its trust to its digital output. This configuration may be extended to data in general, not just digital money bits. Any combination of stored data, and preset computing logic can be housed inside a hard wallet. The wallet will be constructed as for money with human machine interface and with an output port, and for the advanced version also an input port.

Trust Cascade

A hard wallet payee trusts in parallel (i) their physical observation that the hard wallet, and no other source, is passing the digital media claimed to be digital money, and (ii) the physical observation that the hard wallet has not been tampered with, (iii) the identity of the hard wallet as proven by comparing ad hoc physical measurements of the hard wallet to pre recorded results of these measurement.

The payee further trusts that the factory that manufactured the paying hard wallet loaded it with proper digital money and a proper payment routine.

The payee further trusts that the source that minted the digital money is proper.

Online Wallet Payment

New Payment Authentication Options

For centuries payment was based on the credibility of the physical coin, or bank note. In cyber space payment is authenticated either by a central authority (legacy money), or by an elaborate peer authentication. In the central mode one encounters the single-point vulnerability, and in the peer regimen one may falter when not enough peers come through. We propose an in-between mode: an array of multiple authenticators where one of them is sufficient. This method is based on the novel idea of separating between the money paid, and the payment apparatus. An amount of money, X, can be put in a box B given to trader Alice. She activates box B to dispense from it an amount money $Y \leq X$ to Bob. If Bob trusts Alice, he will accept the coin (Y). This trust can be provided by a third party (an insurer). But if Bob does not trust Alice, he can contact the mint of the coin Y and authenticate its bona fide. The alternative presented here is for Bob to contact the builder of box B. That builder will run some remote tests to be convinced that box B has not been tampered with, and on that basis will authenticate the transaction to Bob. In other words, the payment mechanism inside the box is the object of trust. There is a fundamental difference between these three methods of authentication. There is only one ultimate mint, but there can be quite a few sources to authenticate the integrity of box B. This will make it easy to construct a payment regimen where payments flow without delay. This invention describes the technology that will enable the authentication of the box—the wallet—where money is placed, and where the money remittance from the box is governed by a trusted procedure. This trust is based on the trusted integrity of the box (the hard wallet).

Introduction

Digital money is easy to counterfeit and easy to double pay. It will not become the mainstay form of money until these threats are properly resolved. Today there are two modes of solution: (i) a central authentication authority, (ii) network peers authentication. Both have their issues and vulnerabilities. The former exhibits the single-point failure weakness, and the latter exhibit the problem of having no address to complain and present grievances, and also the problem of not having enough participating peers. Also traders encounter a third problem: unaccountable tweaks and changes in the governing algorithm.

Another solution is based on the concept of payer's trust. The payee will accept a payment from a payer that is not likely to be cheating, or for whom some trusted insurer issued a certificate of trust.

Payment trust then is based on authenticating the money that changes hands, or authenticating the payer who claims the digital bits are good money.

This invention offers a third way to trust a payment. Building a box to serve as hard wallet containing both money and a programmed money movement routine, both are trusted by the payee on account of the physical integrity of the box—the wallet—where the money and the routine are housed. This invention is based on the rock of randomness technology that offers such high trust for a hard wallet.

The idea is to resolve the difficulty of single-point failure by devising a solution where the single authenticator is replaced by several authenticators. Unlike the peer authentication where many peers are required, in this solution any single authentication source will suffice.

The mint authentication is hinged on the identity of the transacted money. Ultimately there cannot be two independent authenticators because of the threat of double spending. A fraudster will pay an amount X to seller A, then pay the same digital money, X to seller B. If there are two independent mints, $M_a$, and $M_b$, and each is qualified to authenticate payments, then if A is authenticating the transaction in $M_a$, and B is authenticating the transaction at $M_b$, then both transactions will be OKed and fraud will reign.

To solve this limitation of having one single authentication source for each and every transaction we propose to put a certain amount of digital money, X in a box, a wallet. Along with X one will put in the box a payment system, (routine) P that is designed to make successive payments $Y_1$, $Y_2$, ... such that $$Y_i \leq X - \Sigma Y_j, \ldots \text{ for } j=1,2, \ldots (i-1)$$

And each time a payment $Y_i$ is being made, its bits are being erased.

The box, the wallet, that houses X and P is being sealed using a technology that allows for remote authentication of the integrity of the box: remote authentication of wallets RAW. Using RAW technology a remote authenticator could authenticate a payment $Y_i$ to a payee based on trust that the RAW technology is robust and trustworthy. The power of this wallet-based authentication is that it does not rely on direct money authentication like with the mint, but rather it is based on RAW data which can be freely shared, to establish a large community of authenticators, any one of them would be a proper source of authentication. As long as the wallet has not been tampered with, then the good money that the wallet builder put in it (X) is valid. And since any payment of any amount $Y_i$ from the wallet triggers an immediate erasure of the bits associated with $Y_i$, then there is no fear for a subsequent compromise of the wallet resulting in double spending. In short, a successful compliance with the RAW test, is an alternative authentication method to the mint authentication and the advantage is in the fact that RAW authenticators may be numerous, not single.

The Hard Wallet

The Hard Wallet is a secure enclosure as described above. It is manufactured with the technology of the rock of randomness, which allows for high credibility integrity verification. The integrity of the wallet, the box, projects on the integrity of the money and the money movement logic inside the wallet.

RAW Distribution

Remote authentication of wallets is based on measurements of a solid 'rock', based on the assumption that it is infeasible to construct a rock that would satisfy the full set of measurements taken from another rock. Let $m_i$ be the set of measurements taken from wallet (rock) i, where i=1, 2, ... w, w is the number of manufactured wallets.

Let $M_j$ be the set of measurements taken from a group of wallets. Let $M_0$ be the set of measurements of all the wallets:

$$M_0 = \Sigma m_i \ldots \text{ for } i=1,2, \ldots w$$

We envision a payer, R, holding a hard wallet $W_i$ with which he wishes to pay a payee, E a sum x. The payee decides to accept the bit-wise spewed by $W_i$ on the basis of the RAW procedure in which, the payee E takes $n \leq m_i$ measurements from $W_i$, and then compares these measurements to the previously taken measurements for wallet i. If the measurements taken by the payee, E agree with the measurements recorded earlier for the same wallet, then the payee develops a sense of confidence that the bits coming to it from the alleged wallet $W_i$ do represent the claimed monetary value. This confidence is based on the premise that the paying wallet is visible to have physical integrity, and that its measurements are consistent with what was measured by the original measuring authority, most likely the wallet manufacturer.

A hard wallet payment is a situation where the payer and the payee enjoy physical proximity. The payee verifies the integrity of the payer's wallet, and it has the means to perform conductivity measurements on the wallet. To ascertain the integrity of the wallet before them, the payee needs to have access to pre-measured results of the same measurements parameters. The agreement of the pre-measurements and the present measurements will establish the integrity of the device which the payer claims to be a valid hard wallet.

The question arises: how does the payee find out the numeric results of the pre-measurements?

We consider several options:
1. pre-loaded pre-measurements
2. real time upload of pre-measurements
3. real time dialogue with RW oracle The pre-loaded option is instrumental for situations when he Internet is down. When the Internet is available, the payee, E, will conduct n measurements, and then request the results of these very measurements, to be delivered to the payee from a source that has these measurements. The payee then compares their measurements and the downloaded pre measurements in order to decide whether they trust the paying wallet or not.

In the dialogue option the payee and the source of pre measurements conduct a conversation. In the course of this conversation the payee decides whether to trust the paying wallet or not.

Real-Time Upload of Pre-Measurements

In this mode the payee will query a data source and request measurement results. The query will include the id of the paying wallet, and the attributes of the n measurements conducted over the paying wallet. A typical measurement will specify which ports (electrode terminals) are grouped into one pole which ports are grouped into the opposite pole. The current measured for this setting is used to compute the effective resistance of the wallet for this particular setting of ports. The measurement data source will provide the results of the defined n measurements, for the payee to compare to their present measurements.

In the simplest way there is a single database source, holding the full measurements data of all the manufactured wallet, $M_0$. The payee will query this single source.

This single source for RAW action runs the typical risks, of singular failure and traffic jam. Payees will not wish to wait too long to get the results.

Unlike the situation with the mint where a hierarchy of authentication culminates with the mint, the RAW data base can be readily distributed. Let F be the factory where the wallets are manufactured. We assume that the factory is also where the measurements are taken So F holds $M_0$.

One can then assigned t authenticators $A_1, A_2, \ldots A_t$, where each of these t authenticators will be given a copy of $M_0$. This way any payee E will have an option to query either the factory F or any of the t authenticators.

There are established ways to optimize query load from a community of query initiators (payees) to a group of data sources. Any of these established methods can be used.

Since it is being envisioned that the factory will keep manufacturing wallets, there will have to be an updating procedure from F to the authenticators. If an update is delayed then it may happen that a payee will query an authenticator $A_i(i=1, 2, \ldots t)$ and receive in return a reply "wallet unknown". The payee will be able to query another authenticator or directly inquire with F, or try again a bit later with the same authenticator, hoping that the update arrived.

We further discuss authentication hierarchy, authentication network, and sub-authenticators.

Authentication Hierarchy

Any authenticator $A_i$ may pass its measurement data (the RAW ledger: RAWL) to t' authenticators j=1, 2, . . . t' where $A_{ij}$ is the authenticator j that got its information from authenticator i. This process can be progressed iteratively for as many layers as desired. This will create an authentication hierarchy. Any updates, or revocation data will flow through the hierarchy from its root, the factory F through all the t*t' authenticators.

In the extreme case the authentication hierarchy will continue down to the community of payees. Each payee will hold a copy of the entire ledger $M_0$.

Authentication Network

A set oft authenticators may be linked in fixed or ad hoc network, and use standard network procedures to stream around all the updates. Namely some authenticator $A_i$ will shop around for any source of ledger data update. Finding a source $A_j$, it will use it. The problem with this ad hoc network is that there is no regimented way to insure that all authenticators get timely updates. Albeit, each authenticator if queried about a wallet for which it has no data, will rush to query adjacent authenticators on the network, keep querying, until it gets the data to answer to querying payee. So the payee may not even realize that the authenticator they queried was unaware of the wallet and queried other. In other words, instead of the payee shopping around for an authenticator with proper data, the authenticator will do it for them.

In a hierarchy, an authenticator will go 'up' for updates and for information about unknown wallets.

There is an issue with revocation. If it does not propagate fast enough then an authenticator will deliver OK signal to revoked wallets. Therefore, for payments of substantial amounts (high volume transactions) an authenticator may have a procedural requirement to check back to verify that no revocation signal was issued.

Sub Authenticators

The full RAW ledger, $M_0$ may be divided two ways: (i) ledger data for subsets of the manufactured wallets, and (ii) ledger data for some of the measurements, $m_i$ for a given wallet i. The two divisions may be combined.

Every authenticator, j, whether in a hierarchy mode or in a network mode will be in command of a partial section of the ledger: aware of measurement data $m'_{ij}$ for wallet i.

Since RAW data is needed for wallets that achieve physical proximity it makes sense to have authenticator accumulate ledger data per geographic area.

Several Manufacturers

There may be some f different manufacturers of hard wallets. They may use different technologies: $F_1, F_2, \ldots F_f$. Each of these manufacturers may spawn their own network or hierarchy (or a combination thereto) of authenticators. These authenticators may accumulate ledger data from various manufacturers, to better serve the trading public.

Real Time Dialogue

A dialogue may ensue between the payee and the RAW data source (the manufacturer or the authenticator). It can be as simple as the data upload procedure, or it may a bit different:

Dialogue 1: payee E queries authenticator A: do you have data regarding wallet W?

If the answer is "no" then E can look for another authenticator, or the authenticator may look for another authenticator with data regarding wallet W.

If the answer is 'yes' then E asks for measurement instances. The authenticator then sends to the payee E attributes of some n measurements, where n≤m, where m is the full scope of measurements of W stored in authenticator A.

Payee E measures these n measurement instances, and delivers the results of their measurements to the authenticator A.

The authenticator A compares the information sent from E to its own recorded data. If the data agrees the authenticator sends a signal to the payee saying so. Otherwise the authenticator sends a negative signal.

This dialogue gives the authenticator a proof that the querying payee is in touch with the proper wallet. The authenticator may then query the payee as to the sum of the transaction and make a record of it.

Dialogue 2: Same as dialogue 1 only that the authenticator provides the payee with the measurement results for the payee to compare. This mode is useful if the payee wishes to defend himself against a fake authenticator. They will do so by sending different measurement results to randomly picked several authenticators. Only if all measurements from all the queried authenticators are in full agreement with present measurements, then the payee develops confidence for the integrity of the wallet.

Revocation

Empty wallets may be discarded, or may be returned to the factory for a certain fee. Such wallets will be marked as out of circulation. When the factory or the authenticators will be asked for measurements of such wallets, they will return with a warning: "this is not a valid wallet"—suspicion for error or fraud. The revocation list will need to flow to all the authenticators as fast as possible. There may be various other reasons for revocation and for warnings. For example if measurements conducted over a physical wallet don't agree with the database results. While the hard wallet is pretty robust, it is possible that it will be deformed, for example under the influence of heat or microwave radiation. This will distort the measurements. Such wallets should be sent to the factory and the money inside them will be credited to the submitter.

Security

The security of the RAW procedure is based on (i) the infeasibility to prepare a wallet per prescribed measurement results, (ii) the large number of possible measurement, and (iii) the off-digital backup.

Since the RAW data is not secret, a fraudster could get the data for a particular wallet, then try to construct a fake wallet (wallet with no money in it) that would measure in a way that fits the data in the RAW database for this wallet. This exercise in general is assumed to be futile because of the underlying technology of the rock of randomness.

A fraudster though may construct a fake wallet that will give the right measurements (per the public ledger) over a small number of particular measurements. If the fraudster will succeed in influencing the payee to use these particular measurements then the payee will be duped.

That is the advantage of the dialogue where the selection of the parameters to be measured is done randomly by the authenticator.

Another fraud scenario is to influence a payee to use a fake authenticator that will give results consistent with a fake paying wallet.

To combat this, the payee may use any of the common methods to ascertain authenticity of an authenticator.

Another method is to use multiple sources. A payee suspicious of being served by a fake authenticator may consult a second and a third authenticator. In such verification the querying payee will ask the authenticator to pass to him their results so that the payee can compare the results sent to him from all the authenticators they asked for service.

The most secure mode is the off-digital procedure.

Off Digital Security

Every manufactured wallet may have a twin. The 3D printing technology used to manufacture the wallet allows for identical copies. One copy will be manufactured as an active wallet containing money in it, and the other will be stored by the manufacturer or by an assigned storage agency. This way there will be no need to keep measurements data in a digital (hackable) database. Every query will result in the authenticator with the copy of the rock (wallet) taking live measurements (preferably selected randomly), and then communicate the results to the payee E, or vice versa. If the results agree the wallet is to be authenticated.

Since there can be any number of wallet duplicates manufactured, it will be possible to equip any number of authenticators with the physical copies of the wallets.

Comparative Analysis of Payment Authentication

Methods

The tables below summarize the proposed wallet-based payment versus the traditional methods.

| | | Evaluation Factors | | | | | |
|---|---|---|---|---|---|---|---|
| Trust Mode | how many authenticators | security | congestion risk | fit for large transactions | Payment without Internet | anonymity | remote payment |
| Trust the Money | single | high | high | good | no | optional | acceptable |
| Trust the Payer | few | medium | medium | medium | no | no | acceptable |
| Trust the Wallet | many | high | low | good | yes | optional | no |

| Trust Mode | Money Type | | |
|---|---|---|---|
| | Legacy Money | Crypto Money | BitMint Money |
| Trust the Money | O | X | X |
| Trust the Payer | X | X | X |
| Trust the Wallet | X | O | X |

Features Summary

This invention describes a secure enclosure, regarded as "hard wallet", built to add a third basis for authentication of a digital money transaction, independent of authenticating the money, and authenticating the payer, containing digital money, a pre-programmed routine to handle that money, a communication port enabling the owner of the digital money to communicate with the pre programmed routine, payment ports to pay digital money to a payee, and a money reception port to be paid digital money from a payer, and where the hard wallet can be authenticated by a payee by:

(i) taking physical measurements of the hard wallet (ii) obtaining publicly available data on values of these measurements.

(iii) comparing measurements in (i) to data in (ii), and regarding the hard wallet as authenticated if the comparison in (iii) shows agreement, and based on authentication of the hard wallet, the payee accepts digital bits delivered through the paying port as bona fide money.

This invention also describes a method for payment of digital money between a payer and a payee enjoying a physical proximity while not requiring communication to a remote authenticator of the payment, comprising of A factory, F, that builds a secure enclosure regarded as a "hard wallet" then it performs certain physical measurements of the hard wallet, recording numeric results that uniquely identify the hard wallet, making these results part of a public ledger, then fitting in the hard wallet digital money and money handling logic, then passing the hard wallet to a receiver, the receiver then operating the hard wallet so that it dispenses a digital coin to a payee through a payment port built into the hard wallet, the payee then authenticates the hard wallet as a condition to regarding the hard wallet dispensed digital coin as bona fide money, this authentication will be carried out by (a) performing physical measurements on the hard wallet similar to the measurements performed in the factory, (b) querying the factory, or an agent of the factory that holds the public ledger, and receiving in response the results of the physical measurements performed in the factory, then (c) comparing the measurements results in (a) with the data received in (b), and authenticating the hard wallet if the comparison shows agreement.

The hard wallet is further characterized as being constructed as a random aggregate of material ingredients spanning a wide variety of electric conductivity, and thereby the effective resistance measured between some p arbitrary points in the hard wallet which are connected to one pole of a battery, and q arbitrary points in the hard wallet which are connected to the opposite pole of a battery, reflects the randomness, and thereby the uniqueness, of the construction of the hard wallet, and hence the effective resistance results recorded from conducting t such effective resistance tests over various combinations of p points and q points will reflect the particular measured wallet and no other, and hence an agreement between such prior measurements and measurements taken by a payee upon deciding whether to trust the hard wallet, will build trust which will become greater and greater the more such tests for effective resistance are conducted and show agreement between real time measurements and the public ledger.

The hard wallet may be fitted with a pad attached to the hard wallet surface and the pad is fitted with n electrical contact point, and where each contact point is a terminal of an insulated wire that also terminates in a random location in the hard wallet, and where the pad serves as an area of contact to a measuring device which is built to group a selected group of p contact points on the pad as connected to one pole of a battery, and a different set of q contact points on the pad, where $p+q \le n$, which are connected to the opposite pole of the battery, and where the measuring device will measure the current flowing between the p points of contact and the q points of contact, and from the value of the current, will compute the effective resistance of this p-q setting, this computing result will be inputted to a computing element with access to the effective resistance measured over the same hard wallet via the same groups of p and q contact points, and if the recorded measurements agree with the present measurements then the computing device is outputting a signal to that effect.

The hard wallet may feature a computing device will be loaded with results oft combinations of some contact points grouped to one battery pole, and a different set of contact points grouped to the opposite pole, and the computing device will conduct t measurements of a given hard wallet, and signal if agreement is established between the recorded data and the tested data for all t cases.

The money in the hard wallet may be comprised of meta data and of value bits, regarded as the "payload", and where upon payment of a digital coin, the respective payload will be erased from the memory inside the hard wallet, only the meta data will remain.

The hard wallet may be constructed with a human-machine interface to be fitted to the surface of the hard wallet, and this interface allows the hard wallet to report the amount of money still held in the wallet, and also allows the hard wallet owner to instruct the hard wallet to pay any amount up to the total amount of money in the hard wallet.

The hard wallet may be fitted with a biometric gear that is first trained by the owner of the wallet to recognize a biometric signature of the owner, and then requires the owner to submit to a biometric test to authenticate their identity before any payment is being dispensed.

The payment ports in the hard wallet are any of the following embodiments or some combination thereto: a physical outlet, like a USB or mini USB port, a WiFI connection, Bluetooth, or NFC.

The hard wallet may have no money reception port, and where the hard wallet will pay out digital coins until it exhausts the pre-stored amount of money.

The hard wallet may accept payment from another hard wallet after authenticating its integrity and validity, and then make these funds payable.

A set of hard wallets may practice mutual payments where each payment is based on authenticating the paying hard wallet, and where such payments take place with or without Internet connection or any connection to a remote agent.

The hard wallet, or "hard digital wallet" can also be described as follows: A "hard digital wallet" (HDW) in the form of a specially constructed material box to effect transactions of digital money, or money equivalent, wherein reliance on a communication network, wherein the money or money equivalent digits are dispensed from the HDW, and are being trusted by the payee, following a material construction test ("MCT") to ascertain that the HDW was prepared by a trusted mint, and wherein the payee measures the HDW, verifies the measurement through a public database, published by the mint.

In particular HDW may be constructed from a randomized aggregation of conductivity-variant elements, wherein n insulated wires terminate inside the HDW in randomized locations, such that the effective resistance, R(p,q), measured by uniting p wires as one electrical pole, and uniting q wires as the opposite electrical pole, where $p+q \leq n$, depends on the randomized construction of the HDW and the locations in it of the p+q wire terminals, such that a measurement of R(p,q) that agrees with a pre-published measurement of the same measurement conditions, projects confidence that the measured HDW is the one referenced by the mint, and where such confidence can be amplified by repeating the measurement with a different set of $p' \neq p$ wires and $q' \neq q$ wires, as many times as desired, each time comparing the measured result to the ledger of resistance values published by the mint.

This invention can also be used where the payee is a similar HDW, and the money transferred to it from the paying HDW, may be further paid to a third HDW based on the same HDW validation test.

What is claimed is:

1. A sealed material wallet outputting digital money bits to a payee device which trusts the incoming bits based on authentication of the wallet on account of measuring properties of the wallet and comparing these measurements to listed properties issued by the manufacturer of the wallet, comprising:
   (i) a secure enclosure constructed as a random assembly of materials of different electric conductivity, with w drawn conductive wires inside, where each wire terminates on one end on the surface of the wallet, and on the other end at a random location inside the secure enclosure, and
   (ii) a payment port, fitted on the secure enclosure, and
   (iii) a computing element with payment circuitry including digital bit money fitted inside the secure enclosure, and
   (iv) a Human-Machine communication element, fitted on the surface of the secure enclosure,
   wherein the payee device
   authenticates the wallet by applying an electric current between arbitrary set of p "plus" wires selected among the w wires, and a different arbitrary set of m, "minus" wires, such that m+p<w, and thereby measures the effective electric resistance, R(p,m) of the wallet relative to the selection of the p positive (plus) and the m negative (minus) wires, and then
   comparing R(p,m) to a listed value for this measurement issued by the manufacturer of the wallet,
   then repeating such measurement over different groups of positive and negative wires, for arbitrary number of measurements, then
   concluding, upon agreement between all measurements to their respective wallet manufacturer listed values, that the wallet is authentic and therefore the payment bits outputted by it are valid payment,
   and wherein the owner of the wallet uses the Human Machine communication element to instruct the wallet to pay a certain amount to the payee, that amount, if available in the wallet, is forwarded as a stream of bits through the payment port where the payee device collects the money.

2. The sealed material wallet in claim 1 wherein a first wallet includes an apparatus to authenticate a second wallet, and accept digital money bits coming from the second wallet to the first wallet, the apparatus comprising:
   (i) an authentication element wherein electrical contacts are attached to selected wires in the second wallet, and an electrical current is effected between any selected "plus" wires in the second wallet and any selected "minus" wires in the second wallet, that current being measured by the apparatus of the first wallet, and used to compute the effective resistance of the second wallet per the particular selection of positive and negative wires in the second wallet, comparing this resistance to a pre-loaded resistance value published by the manufacturer of the second wallet,
   conducting repeating measurements of the second wallet per different selections of positive and negative wires within the second wallet, and if all measurements agree with the pre-loaded respective published values, then the first wallet will accept digital bits money paid by the second wallet to the first wallet through the respective payment ports of the two wallets.

3. The sealed material wallet as in claim 1 wherein a security apparatus is incorporated so that only the owner of the wallet can operate it; this security apparatus is one or a combination of the following:
   (i) A data entry element to click a personal identification number, PIN, which is compared to a stored number, allowing for the operation of the wallet if the entered PIN agrees with the stored PIN,
   (ii) A biometric input element that takes a biometric measurement of the wallet operator, comparing this measurement to pre-stored data, allowing for the operation of the wallet only if the measured biometric data agrees with the pre-stored biometric data.

4. A payment station used to carry out a payment between two sealed material wallets as in claim 1 wherein the payment station connects to both wallets, and the money flows through the payment station, from the paying wallet to the paid wallet, and where the payment station is pre-loaded with wallet measurements data generated by the manufacturer of the wallets, and the payment station conducts the measurements of the paying wallet to validate for the paid wallet the bona fide status of the payment.

\* \* \* \* \*